United States Patent [19] [11] 4,000,039
Huschka et al. [45] Dec. 28, 1976

[54] FUEL ELEMENTS FOR HIGH TEMPERATURE REACTORS HAVING SPECIAL SUITABILITY FOR REUSE OF THE STRUCTURAL GRAPHITE

[75] Inventors: Hans Huschka, Grossauheim; Franz Josef Herrmann, Rodenbach, both of Germany

[73] Assignee: HOBEG Hochtemperaturreaktor-Brennelment GmbH, Grossauheim, Germany

[22] Filed: Sept. 18, 1973

[21] Appl. No.: 398,436

[30] Foreign Application Priority Data
Sept. 20, 1972 Germany .......................... 2246180

[52] U.S. Cl. ..................................... 176/71; 423/4; 264/.5
[51] Int. Cl.$^2$ .......................................... G21C 3/02
[58] Field of Search ................................ 176/68–72; 264/.5; 423/4, 20

[56] References Cited

UNITED STATES PATENTS

| | | | |
|---|---|---|---|
| 3,219,408 | 11/1965 | Bradley et al. | 423/4 |
| 3,424,564 | 1/1969 | Bildstein et al. | 423/4 |
| 3,669,832 | 6/1972 | Boettcher | 176/68 |
| 3,679,378 | 7/1972 | Van Impe et al. | 423/4 |

*Primary Examiner*—Verlin R. Pendegrass
*Assistant Examiner*—Peter A. Nelson
*Attorney, Agent, or Firm*—Cushman, Darby & Cushman

[57] ABSTRACT

There are prepared fuel elements for high temperature reactors from which the fuel zone can be removed from the structural graphite after the burnup of the fissile material has taken place so that the fuel element can be filled with new fuel and again placed in the reactor by having the strength of the matrix in the fuel zone sufficient for binding the embedded coated fuel particles but substantially less than the strength of the structural graphite whereby by the action of force it can be easily split up without destroying the particles.

10 Claims, No Drawings

FUEL ELEMENTS FOR HIGH TEMPERATURE REACTORS HAVING SPECIAL SUITABILITY FOR REUSE OF THE STRUCTURAL GRAPHITE

Among the large number of different types of fuel elements for high temperature reactors (particularly of the nuclear or atomic fuel type), the block shaped fuel elements have created an interest and significance. Such fuel elements are hexagonal graphite blocks in which there are broken in parallel to the prism axis bore holes for fuel channels and cooling gas in hexagonal distribution. The fuel in the form of coated particles is bound with a graphite matrix into cylindrically shaped bodies which are inserted into the above-mentioned fuel channels. The binding of the fuel particles with matrix is necessary for safety reasons since in the breaking of a fuel element during operation of the reactor, there must be excluded the possibility that the loose particles trickle out of the bore-holes. Besides the matrix also accepts part of the heat conduction. In order to have a good heat transfer from the fuel inserts into the structural graphite, the inserts are fitted into the bore-holes as well as possible.

The closing of the fuel cycle plays a decisive role in the industrial efficiency of a reactor. Therefore, the non-burned or fertilized fuel must be recovered from the burned fuel elements. According to the present idea, the fuel element is broken for this purpose, the graphite burned to $CO_2$ and the heavy metal supplied to chemical separation.

The burning of this large amount of structural graphite is technologically difficult to accomplish since it must be carried out in hot cells, is uneconomical and considerably increases the cost of the fuel.

It would be a great advantage if one could simply unload and load the structural graphite blocks with heavy metal, e.g. uranium, and place them in the reactor. Consideration has been given to working out the heavy metal inserts from the burned blocks, but until now no usable, industrial process was found for this purpose. Even if a split existed between the fuel insert and the bore wall, the fuel zone stays unmovably fixed through warping and dimensional changes after a suitable burning. In attempts to eliminate the fuel on the one hand, the coated particles are destroyed and on the other hand, the structural graphite is so greatly damaged that the block is no longer usable for a further insertion.

These difficulties can be overcome according to the present invention by development of fuel elements with specific suitability for the further use of the structural graphite while there is inserted for the fuel zone a matrix which has a sufficiently high strength to bind the coated particles corresponding to the safety provisions.

This is accomplished according to the invention by making the strength of the matrix in the fuel zone sufficient to bind the embedded coated fuel particle but substantially less than that of the structural graphite and thereby enabling easy decomposition of the matrix by the action of force without destroying the particles.

The difference in binding strength of the matrix from the structural graphite should be at least 50 kg/cm$^2$ and can be as much as 350 kg/cm$^2$.

The types of matrix used at the present time for fuel inserts consist wholly of electro graphite filler and 10 to 20% binder, in some cases also mixed with natural graphite filler, or natural graphite filler with high binder contents, i.e. 50% or more. They have high strength and are very hard. According to the invention, there is inserted a matrix which consists of graphite filler with only a small binder content, i.e. less than 10%, e.g. 2%. The binder can be as little as 0.5%. The binder can be a conventional binder such as coal tar pitch and/or a resin such as phenol-formaldehyde resin. Preferably, there is used natural graphite powder as the filler. Less preferably there can be used electro graphite such as graphitized petroleum coke powder.

This matrix can be easily decomposed by direct mechanical influences such as for example by working with scraping, grating or boring tools, or by erosion, ultrasonics or vibration; in working the vertically placed fuel zones from below the matrix powder and the coated particles continuously trickle out of the bore-holes and can be led to the further working operation.

The new fuel inserts are put into the bore-holes of the graphite block. The fuel inserts can be molded in known manner for molding powder and coated or encased and coated particles, coked and temperature treated. In order to be able to fit the fuel inserts as exactly as possible in the bore-holes, there can be used the following procedure.

The inserts are only lightly preliminarily pressed, e.g. at 1 to 100 kg/cm$^2$, pushed into the bores-holes with a pressing ram and eventually the pressing completed there, e.g. at 5 to 150 kg/cm$^2$ whereby a tight adjustment to the bore wall takes place. When the block is filled and the bore-holes constructions accordingly are closed, for example, with a screw cap of structural graphite or a stopper of matrix graphite without fuel which becomes firmly fixed in the subsequent heat treatment, the block is highly heated to about 1000° C to coke the matrix and subsequently held for a short time at 1800° C. When this temperature treatment is carried out in a suitable furnace there also can be attained, besides the coking of the matrix, an extensive purification of the graphite block from the fission products. The fission product content in the graphite block can also be held low in known manner by suitable selection of coated particles. The described operating steps of the working out of the fuel zones and of filling the fuel element blocks with new fuel are suited to be carried out in hot cells simply and economically.

The matrix can contain, for example, $(U,Th)O_2$ particles coated with pyrolytic carbon.

Unless otherwise indicated all parts and percentages are by weight.

EXAMPLE 1

Manufacturing of the Fuel Elements

For the fabrication of the cylindrical fuel inserts (11 mm diameter, 40 mm high) overcoated particles are utilized.

For this coated particles are used which contain 5.1% of Uranium and 47.4 weight percent of Thorium as mixed oxide and are coated with a duplex layer of pyrolytic carbon.

The overcoated particles contain 59 weight percent of coated particles and 41% of graphite matrix powder layed on by a dragee type process.

The graphite matrix powder contains 96% natural graphite and 4% phenolic resin binder.

For the fabrication of one fuel insert of the dimensions described above 11.5 g overcoated particles are filled in a steel die and pressed at 150° C (pressure 80 kg/cm²) After pressing the green inserts are filled in the bores of the structural graphite and then heat treated to 800° C for coking the phenolic resin binder. After heat treatment the inserts have such dimensions fitting in the boreholes of the structural graphite block. The binder coke content relative to the matrix is 1.2 weight percent. The matrix density is about 1.2 g/cm³, the particle volume is about 40% of the insert volume.

Measurements of the binding strength of such fuel inserts show values of about 10 kg/cm². The binding strength of the structural graphite however is 250 kg/cm².

EXAMPLE 2

Reutilization of the Structural Graphite after Irradiation

First there was unscrewed the screw cap consisting of structural graphite of the fuel element block coming from the reactor (or the tight fitting stopper consisting of matrix graphite was bored out with a crown borer). Then the fuel zone can be disintegrated with the same crown borer or with a spiral borer or an end-milling cutter.

This operation takes place from below so that the disintegrated fuel particles and matrix graphite crumbs fall freely from the bore-holes of the graphite block. In using a spiral borer it is advantageous to pneumatically assist the disintegrated particles from the block by a channel in the inside of the spiral borer in order to avoid a blocking by poor conveying of material.

It is also possible to use pneumatic conveying of the fuel in working with crown borers.

In both of these cases using spiral and crown borers with pneumatic conveying it is also possible to bore from above downwardly.

According to the present invention, there is saved in a second insertion of the structural graphite block filled with new fuel and breeder material, produced like described in example 1, into the reactor both the cost of the machined graphite block and also the burning or storage of this block. This means in two insertions of a structural graphite block a reduction in cost of about 15%, in a three time insertion of about 20 to 25%.

Finally, it is established that an especial advantage of the process of the invention is that by reducing the burning of graphite in half or to one-third, brings nearer the solution of a significant problem in regard to protecting the environment.

What is claimed is:

1. A fuel element for a high temperature reactor comprising a structural graphite block and a fuel zone comprising a graphite matrix containing embedded, coated fissile material particles, said fuel zone being removable from the structural graphite after burnup of the fissile material so that the fuel element can be filled with new fuel and again inserted in the reactor, said graphite matrix having sufficient strength to bind the embedded coated fuel particles which strength is at least 50 kg/cm² less than the binding strength of the structural graphite whereby by the action of force said matrix can be easily split up without destroying the fuel particles.

2. A fuel element according to claim 1 wherein the matrix consists essentially of a carbon filler and binder coke, the amount of coke being less than 10.

3. A fuel element according to claim 2 wherein the carbon of the matrix is natural graphite.

4. A process of separating the structural graphite block from the fuel zone of a fuel element for a high temperature reactor, said fuel element comprising a structural graphite block having bore-holes therein and a fuel zone comprising a graphite matrix containing embedded, coated fissile material particles, said fuel zone being compressed into the bore-holes of the structural graphite block and being removable from the structured graphite after burnup of the fissile material so that the fuel element can be filled with new fuel embedded in graphite matrix by compressing it and again inserted in the reactor, said graphite matrix having sufficient strength to bind the embedded coated fuel particles which strength is at least 50 kg/cm² less than the binding strength of the structural graphite, said process comprising disintegrating the matrix with a force insufficient to damage the structural graphite.

5. A process according to claim 4 wherein the disintegration is accomplished mechanically.

6. A process according to claim 4 wherein the disintegration is accomplished by erosion.

7. A process according to claim 4 wherein the disintegration is accomplished ultrasonically.

8. A process according to claim 4 including the steps of refilling the bore-holes in the structural graphite block after removal of the disintegrated matrix with lightly precompressed fuel inserts and then finishing the compressing of the fuel inserts in the structural graphite block.

9. A fuel element according to claim 1 wherein the binding strength of the graphite matrix is 50 to 350 kg/cm² less than the binding strength of the structural graphite.

10. A process according to claim 4 wherein the binding strength of the graphite matrix is 50 to 350 kg/cm² less than the binding strength of the structural graphite.

* * * * *